United States Patent
Johnston

(10) Patent No.: US 11,126,808 B1
(45) Date of Patent: Sep. 21, 2021

(54) METHODS FOR DOT CODE IMAGE PROCESSING ON A GLASS CONTAINER

(71) Applicant: Owens-Brockway Glass Container Inc., Perrysburg, OH (US)

(72) Inventor: Karl Johnston, Perrysburg, OH (US)

(73) Assignee: Owens-Brockway Glass Container Inc., Perrysburg, OH (US)

(*) Notice: Subject to any disclaimer, the term of this patent is extended or adjusted under 35 U.S.C. 154(b) by 93 days.

(21) Appl. No.: 16/426,902

(22) Filed: May 30, 2019

(51) Int. Cl.
*G06K 9/00* (2006.01)
*G06K 7/10* (2006.01)
*G06K 7/14* (2006.01)

(52) U.S. Cl.
CPC ..... *G06K 7/10722* (2013.01); *G06K 7/10881* (2013.01); *G06K 7/1443* (2013.01); *G06K 2007/10524* (2013.01)

(58) Field of Classification Search
CPC ............. G06K 7/10722; G06K 7/1443; G06K 7/10881; G06K 2007/10524
See application file for complete search history.

(56) References Cited

U.S. PATENT DOCUMENTS

| | | | |
|---|---|---|---|
| 6,082,619 A | 7/2000 | Ma et al. | |
| 6,533,182 B1 | 3/2003 | Ohshima et al. | |
| 6,614,847 B1* | 9/2003 | Das | H04N 19/537 375/240.15 |
| 7,337,970 B2 | 3/2008 | Joseph et al. | |
| 7,412,089 B2 | 8/2008 | Squires et al. | |
| 7,428,688 B2 | 9/2008 | Reichenbach | |
| 7,726,572 B2 | 6/2010 | He et al. | |
| 7,997,502 B2* | 8/2011 | Lv | G06K 9/32 235/494 |
| 8,584,953 B2 | 11/2013 | Zolotov | |
| 9,135,489 B2 | 9/2015 | Zhang et al. | |
| 9,659,203 B2 | 5/2017 | Wang | |
| 2002/0176638 A1* | 11/2002 | Stone | G06T 5/003 382/294 |
| 2007/0041053 A1* | 2/2007 | Cooper | H04N 1/4053 358/3.03 |
| 2007/0272755 A1 | 11/2007 | Chang et al. | |
| 2008/0056567 A1* | 3/2008 | Kwon | G06T 5/009 382/168 |

(Continued)

FOREIGN PATENT DOCUMENTS

| | | | | |
|---|---|---|---|---|
| CN | 102831420 | * | 12/2012 | ............... G06K 9/46 |
| CN | 103530878 | | 1/2014 | |

*Primary Examiner* — Amara Abdi

(57) ABSTRACT

A system and method for use in decoding a dot code carried by a glass substrate or container. The method comprises converting an image of a dot code to a grayscale image to remove effects of at least one of color of the glass substrate or color of ambient light, where the image includes a plurality of circular dots; detecting edges of the circular dots in the grayscale image to produce an edge-detected image; filtering the edge-detected image to produce a filtered image; applying a Close transform to convert open instances of the circular dots to closed instances of the circular dots; and identifying quantity and position of all of the circular dots. The method may further include applying a transform to remove background noise from the filtered image and/or filling all the closed instances of the circular dots.

26 Claims, 5 Drawing Sheets

(56) References Cited

U.S. PATENT DOCUMENTS

| | | | |
|---|---|---|---|
| 2008/0317455 A1* | 12/2008 | Abe | G06K 9/00302 |
| | | | 396/263 |
| 2009/0212112 A1* | 8/2009 | Li | G06K 7/10 |
| | | | 235/462.12 |
| 2010/0118069 A1* | 5/2010 | Kayahara | B41J 11/008 |
| | | | 347/9 |
| 2012/0145779 A1 | 6/2012 | Bietenbeck et al. | |
| 2013/0084004 A1 | 4/2013 | Tecu et al. | |
| 2015/0028110 A1* | 1/2015 | Bryant | G06K 19/06046 |
| | | | 235/494 |
| 2015/0117717 A1* | 4/2015 | Cho | G06T 7/11 |
| | | | 382/106 |
| 2017/0061350 A1 | 3/2017 | Smith et al. | |
| 2018/0137321 A1 | 5/2018 | Jiang et al. | |
| 2018/0137322 A1 | 5/2018 | Jiang et al. | |

* cited by examiner

METHODS FOR DOT CODE IMAGE PROCESSING ON A GLASS CONTAINER

The present disclosure is directed to detection and image processing of a code and, more particularly, to a method for use in detection of a dot code carried by a glass container.

BACKGROUND

One- and two-dimensional readable marks can be used for identifying products carrying the marks. For example, the marks can be used for serialization, tracking, and/or other purposes. Some examples of marks or codes can include a bar code or a 2D data matrix. Various imaging equipment can be used to obtain an image of the mark or code on the product, and the imaging or other equipment can perform image processing to recognize the readable mark.

BRIEF SUMMARY OF THE DISCLOSURE

The present disclosure embodies a number of aspects that can be implemented separately from or in combination with each other.

In accordance with one aspect of the disclosure, a method of decoding a dot code is provided that includes convening an image of a dot code carried on a glass substrate to a grayscale image to remove effects of at least one of color of the glass substrate or color of ambient light, where the image includes a plurality of circular dots; detecting edges of the circular dots in the grayscale image to produce an edge-detected image; filtering the edge-detected image to produce a filtered image; applying a Close transform to convert open instances of the circular dots to closed instances of the circular dots; and identifying quantity and position of all of the circular dots. In some implementations, the method may include obtaining an image of the dot code on the glass substrate; applying a transform to remove background noise from the filtered image; and/or filling all the closed instances of the circular dots.

In accordance with another aspect of the disclosure, a non-transitory computer-readable medium with instructions stored thereon, that, when executed by a processor, performs the steps of converting the image to a grayscale image to remove effects of at least one of color of the glass substrate or color of ambient light, where the image includes a plurality of circular dots; detecting edges of the circular dots in the grayscale image to produce an edge-detected image; filtering the edge-detected image to produce a filtered image; applying a Close transform to convert open instances of the circular dots to closed instances of the circular dots; and identifying quantity and position of all of the circular dots. In some instances, the instructions may perform the steps of applying a transform to remove background noise from the filtered image and/or filling all the closed instances of the circular dots.

In accordance with another aspect of the disclosure, an image processing system for decoding a dot code carried on a glass substrate is provided that includes a central server; a consumer electronic device configured to capture an image of the dot code and to electronically communicate the captured image to the central server; and a database accessible by the server and that provides storage for data relating to the image of the dot code; wherein the consumer electronic device can be configured to: convert an image of a dot code to a grayscale image to remove effects of at least one of color of the glass substrate or color of ambient light, wherein the image includes a plurality of circular dots; detect edges of the circular dots in the grayscale image to produce an edge-detected image; filter the edge-detected image to produce a filtered image; apply a Close transform to convert open instances of the circular dots to closed instances of the circular dots; and identify quantity and position of all of the circular dots. In some instances, the consumer electronic device may be configured to apply a transform to remove background noise from the filtered image and/or fill all the closed instances of the circular dots.

BRIEF DESCRIPTION OF THE DRAWINGS

The disclosure, together with additional objects, features, advantages and aspects thereof, will be best understood from the following description, the appended claims, and the accompanying drawings, in which:

DETAILED DESCRIPTION

A general object of the present disclosure, in accordance with at least one aspect of the disclosure, is to provide a method for detecting and decoding a dot code carried on a glass substrate. The glass substrate may include a glass container.

Traceability of glass containers can include individually marking the containers with a code as they are manufactured. Using a code on each container for tracing can facilitate improvements in manufacturing processes because commercial variations or other information associated with the containers can be tracked. Additionally, using marked bottles can be used for anti-counterfeiting efforts. One necessary step in using a marked or coded bottle can include reliably reading a non-ideal image of the code on each container, for example, a dot code. This can be challenging in a consumer setting where specialized optical hardware (e.g., a dedicated code reader) may not be available.

A 2D data matrix printed directly on a label or a flat surface, if evenly illuminated, may have all of the matrix in sharp relief, with no processing necessary to separate the matrix from the background because the image is taken using diffuse reflection off of the surface. In this case, the only thing that will cause an area of the image to be bright or dark is whether there is a bright or a dark part of the matrix printed in that location of the image. With a matrix of dots on transparent glass, there is little or no diffuse reflection from the matrix, and specular reflection must be relied on. When illuminated from a single light source, the specular reflections from each dot can reflect from slightly different angles into a camera imaging the matrix, and, since the dots themselves can be 3D curves, different parts of each dot may be illuminated in the image, and light reflecting from other parts of each dot may miss the camera and result in dark areas in the image captured by the camera. Employing the method and system described herein improves the ability of a standard circle detection algorithm to detect the individual dots in the dot code, even when the raw image of the code is on transparent glass or of poor quality and is a 3D dot matrix code.

Figure 1:
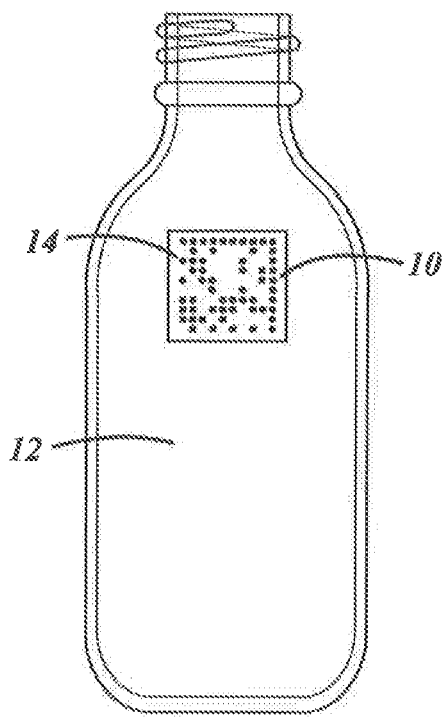
FIG. 1 is a diagrammatic view illustrating a container carrying a dot code thereon, in accordance with an illustrative embodiment of the present disclosure.

FIG. 1 illustrates a dot code 10 carried on a glass container 12 and/or a glass substrate. In this embodiment, the dot code 10 includes a plurality of circular dots 14. In embodiments, the glass container 12 may include, for example, a bottle, a jar, a jug, a food or beverage container, or another suitable container in which a variety of goods or products may be packaged, including, for example and without limitation, various types of food products and other liquids, gels, powders, particles, and the like. For example, the glass container 12 can be formed of glass for packaging goods/products. The glass container 12 may be fabricated using a number of manufacturing processes depending on the material from which the container is formed. For example, when formed of glass, the glass container 12 may be fabricated using a press-and-blow, blow-and-blow, or hand blowing manufacturing process. It will be appreciated that the present disclosure is not intended to be limited to containers of any particular material(s) or any particular manufacturing process(es). In a specific embodiment, however, the glass container 12 comprises a bottle formed of glass.

As illustrated in FIG. 1, the dot code 10 may be disposed on or embedded in the glass container 12 and can be configured to be readable by an appropriately configured consumer electronic device 16 (e.g., a smart phone, a tablet, a consumer-grade camera, and the like) or another device suitable to scan or image the dot code 10. In implementations, the consumer electronic device 16 is not specialized optical hardware (e.g., a dedicated code reader).

The dot code 10 may be a visible, passive, and/or unique machine-readable code (e.g., smart phone-readable) that may be permanently disposed on, embedded in, and/or etched onto or into the glass container 12. For example, in an illustrative embodiment, the dot code 10 may include a code laser-etched into a surface (e.g., outer surface) of the glass container 12 and/or between inner and outer surfaces of the container 12. In another example, the dot code 10 may be printed onto a surface of the glass container 12. The dot code 10 may include any identifying marking with one or more optically-readable elements or combination of elements (e.g., dots) arranged in a particular manner. In the embodiment illustrated in FIG. 1, the dot code 10 includes a 2D matrix of circular dots 14. However, it will be appreciated that the dot code 10 may include other configurations. The dot code 10 can be representative of certain predetermined information relating to the glass container 12 and/or a product within the glass container 12. This information may include, for example, a date of container manufacture, a time of container manufacture, production facility data, container quality data, and/or other information relating to the product within and/or the glass container 12 itself.

Following the manufacture of the glass container 12 and placement of the dot code 10 on the glass container 12, the dot code 10 may be read by the consumer electronic device 16 and associated with the glass container 12 by the consumer electronic device 16 and/or stored in a database 22 of an image processing system 18, where the associated information may be used for decoding the dot code 10 at various points in a supply chain, for example a final destination with an end user.

Figure 2:
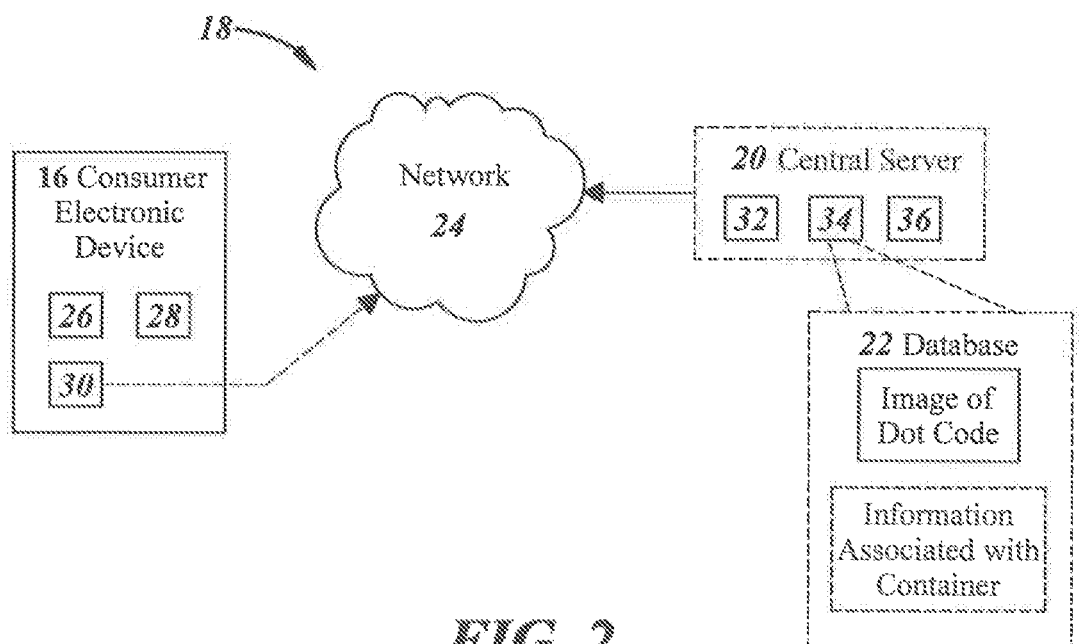
FIG. 2 is a diagrammatic view illustrating an image processing system for decoding the dot code illustrated in FIG. 1.

FIG. 2 depicts an operating environment that comprises an image processing system 18 for implementing the method disclosed herein. The image processing system 18 can include a central server 20, at least one consumer electronic device 16 electrically connected to (e.g., wireless or over a wired network) and configured for communication with the central server 20, and a database 22 that is part of and/or accessible by the server 20. It will be appreciated that the disclosed method can be used with any number of different systems and is not specifically limited to the operating environment shown in FIG. 2. The following paragraphs provide a brief overview of one illustrative embodiment of the image processing system 18; however, other systems not shown here could employ or perform the disclosed method as well.

The consumer electronic device 16 of the image processing system 18 may be used to read (e.g., scan and/or capture images of) machine-readable codes carried by containers, for example, the dot code 10 carried by glass container 12 shown in FIG. 1, and, in at least some embodiments, to obtain the data contained within or represented by the dot code 10. With respect to FIG. 2, the consumer electronic device 16 can be configured to read the dot code 10 and transmit information to and/or from a central server 20 over a network 24 (e.g., to and/or from a database 22 in network 24).

The consumer electronic device 16 may comprise or include any number of devices known in the art, for example and without limitation, camera-based readers (e.g., a smartphone, a tablet computer, a hand-held scanner or device, or other personal digital electronic devices configured to capture an image or to scan or read the dot code 10), non-handheld devices, or a combination of both handheld and non-handheld devices. As stated previously, the consumer electronic device 16 is generally not specialized optical hardware (e.g., a dedicated code reader). It will be appreciated that the image processing system 18 and the associated environment may include a single consumer electronic device or a plurality of consumer electronic devices, which can be located and/or used at different points throughout the distribution chain.

As illustrated in FIG. 2, the consumer electronic device 16 may comprise any suitable apparatus that may include an electronic processor or processing device 26, an electronic memory device 28 that is part of and/or accessible by the processing device 26, a communications interface 30, a power supply (not shown), and/or other suitable hardware and software.

In implementations, the consumer electronic device 16 may include an application configured to obtain images of the dot code 10. The application can be configured to be coded for reading codes from the glass container 12 and the like. With regard to the application, the application can be configured to perform the method steps herein for processing an image of the dot code 10. For example, the consumer electronic device 16 may include means for acquiring an image of the dot code 10 and/or for detecting and decoding the dot code 10 being scanned. In an embodiment, the consumer electronic device 16 can include a smart phone having a camera and internet connectivity. In any event, the consumer electronic device 16 may comprise any machine-readable code readers/image capturing devices and may include a combination of hardware, software, and/or other components that enables the scanning or reading of machine-readable codes, among potentially other functionality.

The consumer electronic device 16 can be configured to capture an image of the dot code 10 using, for example, an image capturing device (e.g., a camera). The consumer electronic device 16 may further be configured to transmit the images of the dot code 10 to the central server 20 over the network 24 and to receive and/or analyze received information from the central server 20 over network 24. For example, the consumer electronic device 16 can obtain and/or transmit an image of the dot code 10 and associated information from one location (e.g., a filling location, an end-use location, etc.) and transmit that image to the central server 20 over network 24 for image and information processing and/or storage.

The processing device 26 of the consumer electronic device 16 may include any type of suitable electronic processing device (e.g., programmable microprocessor, microcontroller, central processing unit (CPU), application specific integrated circuit (ASIC), etc.) that is configured to process data and/or execute appropriate programming instructions for software, firmware, programs, applications, algorithms, scripts, etc., necessary to perform various functions of the consumer electronic device 16. The memory device 28 may include, for example, random access memory (RAM), read only memory (ROM), hard disk(s), universe serial bus (USB) drive(s), memory card(s), or any type of suitable electronic memory means (e.g., non-transitory computer-readable medium with instructions stored thereon) and may store a variety of data. This includes, for example, software (e.g., code or logic), firmware, programs, applications, algorithms, scripts, etc., required to perform functions of the consumer electronic device 16.

In at least certain embodiments, the consumer electronic device 16 may also include one or more components to enable a user to manually provide or input certain data relating to the container(s) to which the machine-readable code(s) being scanned or read by the consumer electronic device 16 correspond. This data may include, for example, container location, container contents, container inspection data, date and/or time data, and other useful data. More particularly, the consumer electronic device 16 may include a user interface (not shown), for example and without limitation, a touch screen, keypad, keyboard, etc., that a user may utilize and/or manipulate to provide data or information relating to one or more containers. The consumer electronic device 16 may further include a communications interface 30 that may include or be electrically connected to certain communication-supporting infrastructure (e.g., one or more known components/devices, for example, routers, modems, antennas, electromechanical ports, transceivers, etc.) to allow for the communication and exchange of data between the consumer electronic device 16 and one or more other components of the image processing system 18, for example, the central server 20. For example, the central server 20 may be configured to provide information and/or statistics (e.g., location, travel time, and so forth) to the consumer electronic device 16.

The central server 20 may be used to control, govern, and/or manage certain operations or functions of the image processing system 18, including performing or facilitating some or all of the functionality of the method described herein. The server 20 may be a standalone component or part of either another component or a larger system or network. Further, the central server 20 may comprise a single server element or a plurality of server elements. In the latter instance, the individual server elements may be electrically connected to each other to allow communication therebetween. The central server 20 may be implemented with a combination of hardware, software, firmware, and/or middleware, and, in an illustrated embodiment, may include one or more electronic processors or processing devices 32 and one or more electronic memory devices 34. In an embodiment, the memory device 34 may be a component of the processing device 32, while in another embodiment, it may be separate and distinct therefrom but accessible thereby.

Similar to the processing device 26 of the consumer electronic device 16, the processing device 32 may comprise any type of suitable electronic processor or processing device (e.g., programmable microprocessor, microcontroller, center processing unit (CPU), application specific integrated circuit (ASIC), etc.) that is configured to receive and process data and/or execute appropriate programming instructions for software, firmware, programs, algorithms, scripts, etc., to perform various functions, for example and without limitation, those relating to the method described herein. The central server 20 and/or the processing device 32 may further include an input/output (I/O) or at least one communication interface 36 through which input and output signals may pass, for example, those communicated between the consumer electronic device 16 and the server 20 or between the server 20 and other components that may or may not be part of the image processing system 18. The communication interface 36 may include, or be electrically connected to and configured for communication with, certain communication-supporting infrastructure (e.g., one or more known components/devices, for example, routers, modems, antennas, electrical ports, transceivers, etc.), and is/are configured to communicate with various components of the image processing system 18 via a public or private network or using other suitable communication techniques or protocols including, but not limited to, one or more of those described herein.

The memory device 34 may include, for example, random access memory (RAM), read only memory (ROM), hard disk(s), universe serial bus (USB) drive(s), memory card(s), or any type of suitable electronic memory means (e.g., non-transitory computer-readable medium with instructions stored thereon) and may store a variety of data. This includes, for example, software (e.g., code or logic), firmware, programs, algorithms, scripts, and other electronic instructions that, for example, are required to perform one or more of the functions described herein; and, in an embodiment, various data structures (e.g., databases, for example, database 22) for storing various information and data, including that required to perform some or all of the functions or method described herein.

As will be described in greater detail below, the server 20 may be configured and operable to receive data from one or more other components of the image processing system 18 (e.g., consumer electronic device 16), and to store the received data in one or more database 22 stored in a suitable electronic memory device, for example and without limitation, the memory device 34 of the central server 20. Additionally, in at least certain embodiments, the central server 20 may also be configured to process and compile data that it receives and/or that is stored in the database 22, to generate reports relating to the received/stored data, to generate and/or interface with user interfaces displayed on a display device associated with the server 20 and/or the consumer electronic device 16 to provide data to and/or receive data from a user of the image processing system 18.

While certain consumer electronic devices and arrangements relating thereto have been described herein, it will be appreciated that the present disclosure is not limited to the use of any particular type of consumer electronic device(s) or corresponding arrangement(s). Additionally, the image processing system 18 may include and/or be configured to support any number of consumer electronic devices. As will be appreciated in view of the description of the method set forth below, the consumer electronic device 16 may be distributed at different points or locations throughout a distribution chain in which containers travel (e.g., container manufacturer, customer, point of sale, consumer/end user, return/collection center, etc.). Accordingly, the image processing system 18 may include one or a plurality of consumer electronic devices, and thus, is not limited to any particular number of consumer electronic devices 16.

As briefly described above, various components of the image processing system 18 may be configured to communicate with each other to exchange data therebetween. This communication may be facilitated across a suitable communications network through communication interfaces of the individual components. The communications network 24 may comprise a wired and/or wireless network, for example, one or a combination of: a suitable Ethernet network; radio and telecommunications/telephone networks (e.g., cellular networks, analog voice networks, or digital fiber communications networks); or any other suitable type of network and/or protocol (e.g., local area networks (LANs), wireless LANs (WLANs), broadband wireless access (BWA) networks, personal area networks (PANs), publicly switched telephone networks (PSTNs), etc.). The communications network 24 may be configured for use with one or more standard communications technologies and protocols, and may utilize links using known technologies, for example, Ethernet, IEEE802.11, integrated services digital network (ISDN), digital subscriber line (DSL), as well as other known communications technologies. Similarly, the networking protocols used on a network to which some or all of the components of the image processing system 18 are interconnected may include multi-protocol label switching (MPL), the user datagram protocol (UDP), the hypertext transport protocol (HTTP), the simple mail transfer protocol (SMTP), and the file transfer protocol (FTP), among other suitable network protocols. In an embodiment, the transmission control protocol/Internet protocol (TCP/IP) may be used, in which case it will be appreciated that each component configured for communication using such a protocol can be configured with a static IP address or can be set up to automatically receive an assigned IP address from another device on the network. Further the data exchanged over such the network 24 may be represented using technologies, languages, and/or formats, for example, the hypertext markup language HTML), the extensible markup language (XML), and the simple object access protocol (SOAP) among other suitable data representation technologies. Accordingly, it will be appreciated in view of the foregoing that the communication between various components of the image processing system 18 may be facilitated in any number of ways using any number of techniques, and therefore, the present disclosure is not limited to any particular way or technique(s); rather any suitable way or technique may be utilized.

The database 22 may be located and/or stored in or on a suitable electronic memory device, for example, the memory device 34 of the central server 20 or another suitable memory device of and/or accessible by the central server 20. The present disclosure is not intended to be limited to the database 22 being stored in or on any particular memory device.

Figure 3:
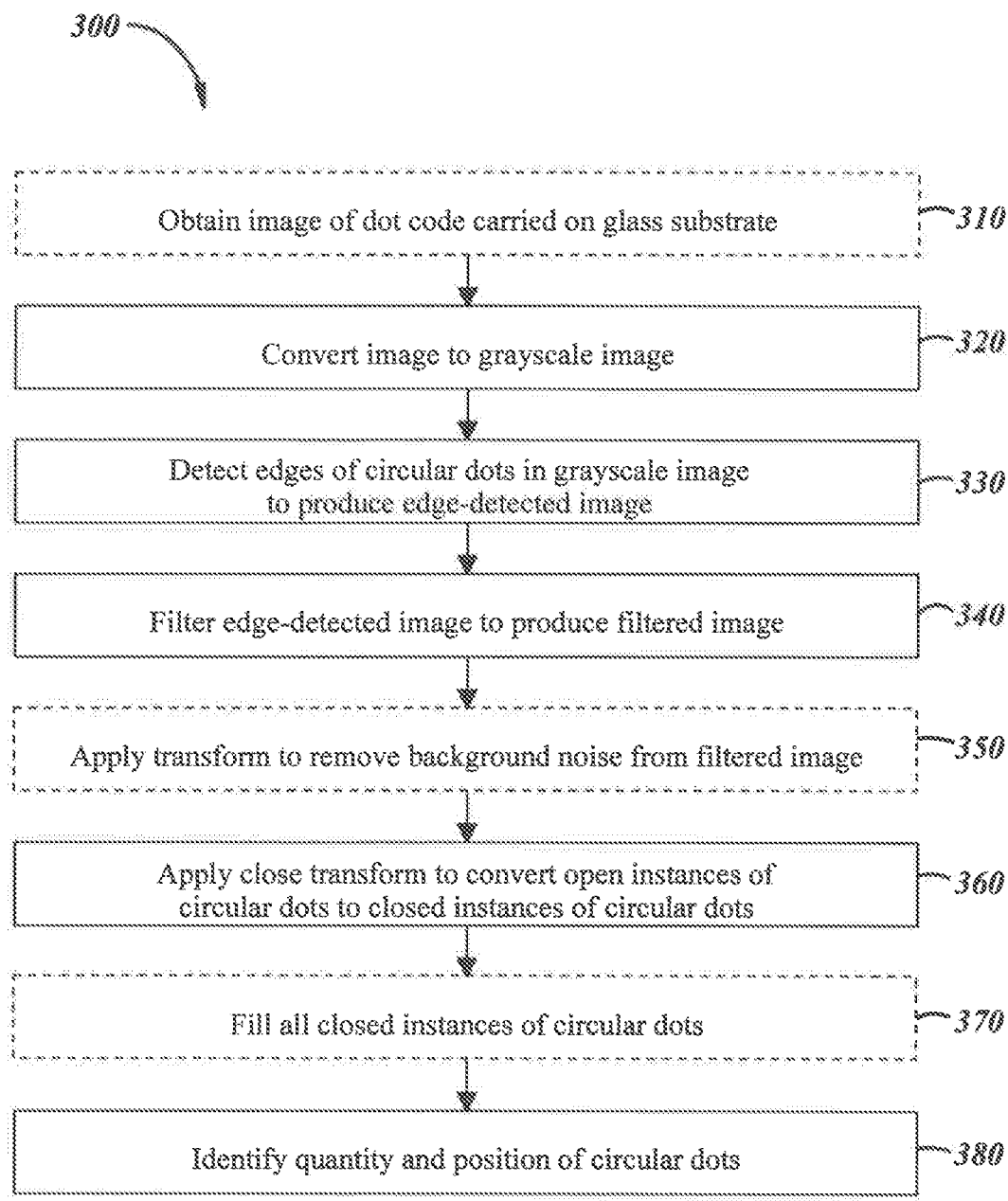
FIG. 3 is a flow diagram showing various steps of an illustrative embodiment of a method for detecting the dot code carried by the container in FIG. 1.

FIG. 3 illustrates an example of a method 300 for use in decoding a dot code 10 carried by the glass container 12. For purposes of illustration and clarity, method 300 will be described in the context of the glass container 12 and the operating environment of the image processing system 18 described above and illustrated in FIGS. 1 and 2. It will be appreciated, however, that the application of the present methodology is not meant to be limited solely to such a glass container and/or operating environment, but rather method 300 may find application with any number of containers and operating environments. It will be further appreciated that while steps of the methodology may be described in a particular order or and/or as being performed by particular components, unless otherwise noted, the present disclosure is not limited to any particular order of steps or to any particular components performing the steps.

In an embodiment, method 300 may comprise a step 310 of obtaining an image of the dot code 10 carried on a glass substrate (e.g., the glass container 12). In implementations, obtaining the image of the dot code 10 may include using the consumer electronic device 16 to collect or capture an image of the dot code 10. The image of the dot code 10 may include light reflected from and/or transmitted through the glass container 12. For example, the consumer electronic device 16 may include an image capturing device (e.g., a camera) that can be configured to capture a color and/or a black-and-white image of the dot code 10. In some embodiments, the consumer electronic device 16 may be configured to give the user guidance to better enable collection of the image of the code (e.g., instruction as to when and how to use the consumer electronic device 16 to take a picture). In some instances, obtaining the image of the dot code 10 can include obtaining a negative image of transmitted light through the glass container 12, where the image is inverted and the light areas appear dark and the dark areas appear light. In these instances, the negative image may be converted to a positive image. Additionally, in some embodiments, obtaining an image of the dot code 10 may include communicating the captured image of the dot code 10 to the central server 20 over network 24 when the central server 20 and/or processor 32 is used to process the captured image.

Figure 4:
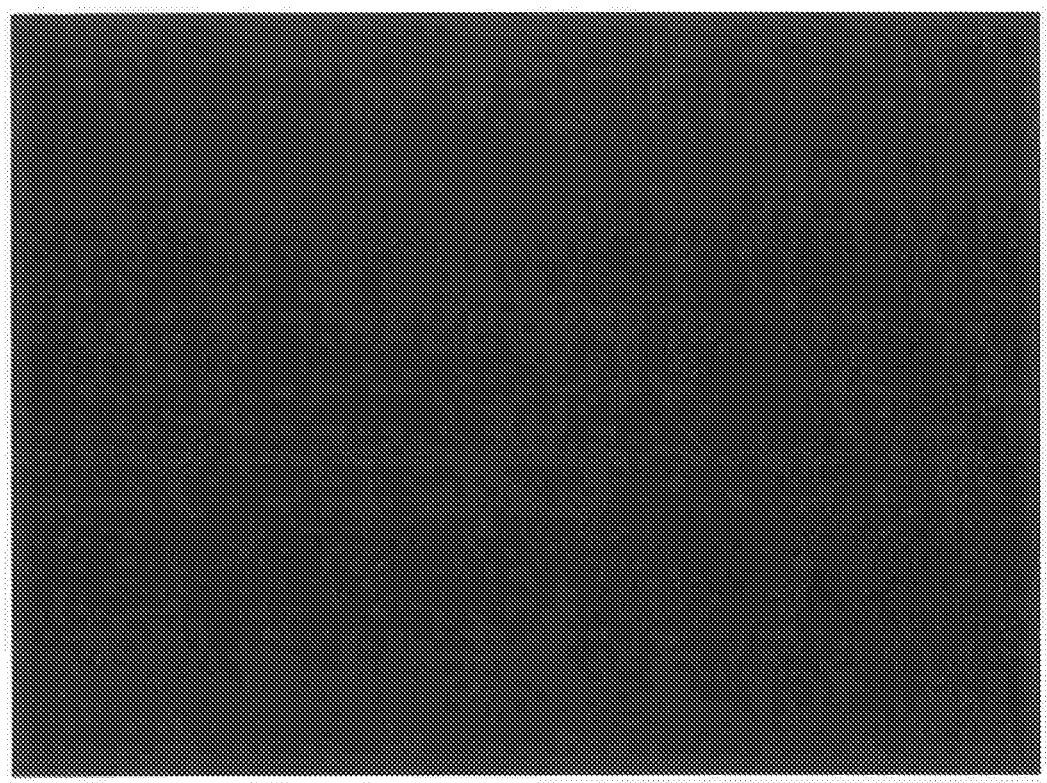
FIG. 4 is a graphical illustration of an image of the dot code in FIG. 1 that has been converted to grayscale.

Method 300 includes a step 320 of converting the image to a grayscale image to remove effects of at least one of color of the glass container 12 or color of ambient light, where the image includes a plurality of dots. Colorimetry can be used to calculate grayscale luminance values from color luminance values of the obtained image so as to have the same luminance as the original color image. In one embodiment, converting the colorimetric image of the dot code 10 to a grayscale representation of its luminance may include using a grayscale image transform, for example, a lightness algorithm, which averages the most prominent and the least prominent colors using the RGB color model (e.g., (max (R, G, B)+min (R, G, B))/2). Using a grayscale image transform can be beneficial because it can use less processing power and time compared to other methods. In another embodiment, converting the colorimetric image of the dot code 10 to a grayscale representation of its luminance may include using an average method, which averages the RGB color intensity values (e.g., (R+3+B)/3). In yet another embodiment, converting the colorimetric image of the dot code 10 may include using a luminosity method, which uses a weighted average to account for human perception of the RGB color intensity values (e.g., (0.21R+0.72G+0.07B)). It will be appreciated that other grayscale transforms may be utilized in step 320 that are not listed. One example of an image of a dot code 10 that has been converted to a grayscale image is illustrated in FIG. 4. In implementations, converting the obtained image to a grayscale image may be performed by the processor 26 of the consumer electronic device 16 and/or the processor 32 of the central server 20.

Figure 5:
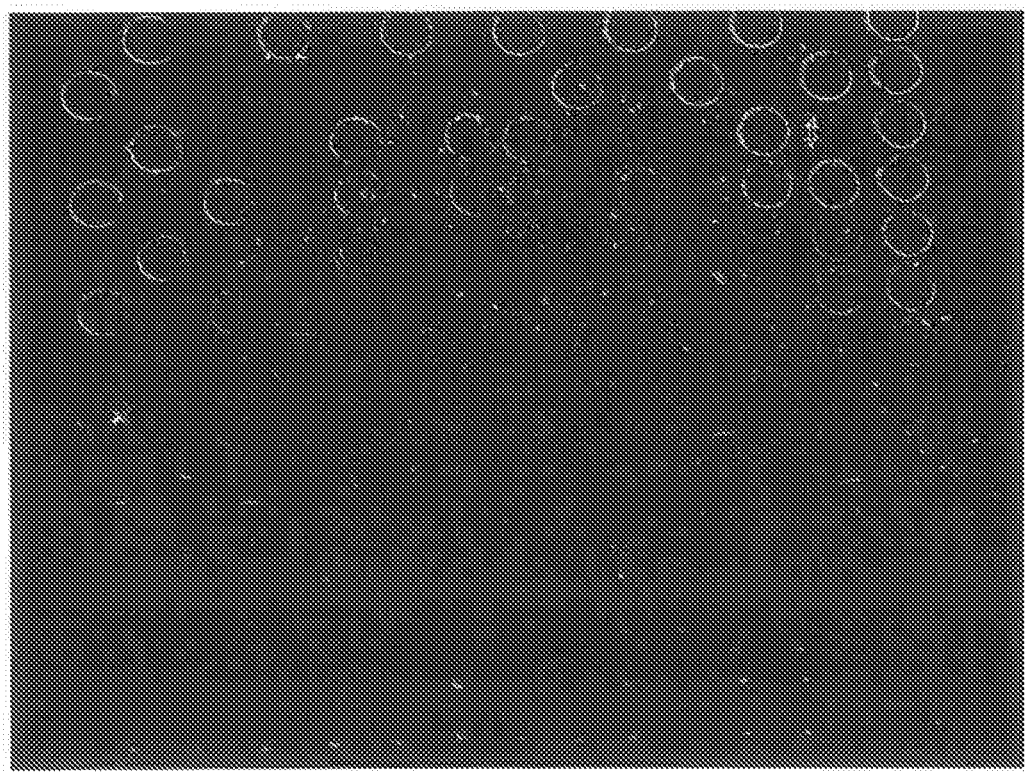
FIG. 5 is a graphical illustration of an edge-detected image of the dot code in FIG. 1.

Method 300 further comprises a step 330 of detecting edges of the circular dots in the grayscale image to produce an edge-detected image. In the context of an image of the dot code 10, an edge is a collection of pixels whose gray value has a step change and/or an area of the image where brightness of a local area within the image changes significantly. With respect to the dot code 10, an edge can include a local area moving between a dot and a background of the dot code 10. In one example, a Sobel operator can be used to detect the edges of the circular dots of the dot code 10, which result in a scalar image. The Sobel operator can perform a 2-D spatial gradient measurement on the dot code 10 and emphasize a region of high spatial frequency that corresponds to the edges by finding the approximate absolute gradient magnitude at each point in an input grayscale image. An example of an image of a dot code 10 where edges of the circular dots have been detected using a Sobel operator is illustrated in FIG. 5. It is contemplated that step 330 may utilize other operators and/or algorithms to detect edges of the circular dots in the grayscale image of the dot code 10, for example, Prewitt, Roberts, Laplacain, and/or Log and Canny edge detection operators. Detecting edges of the circular dots may be performed by the processor 26 of the consumer electronic device 16 and/or the processing device 32 of the central server 20.

Figure 6:
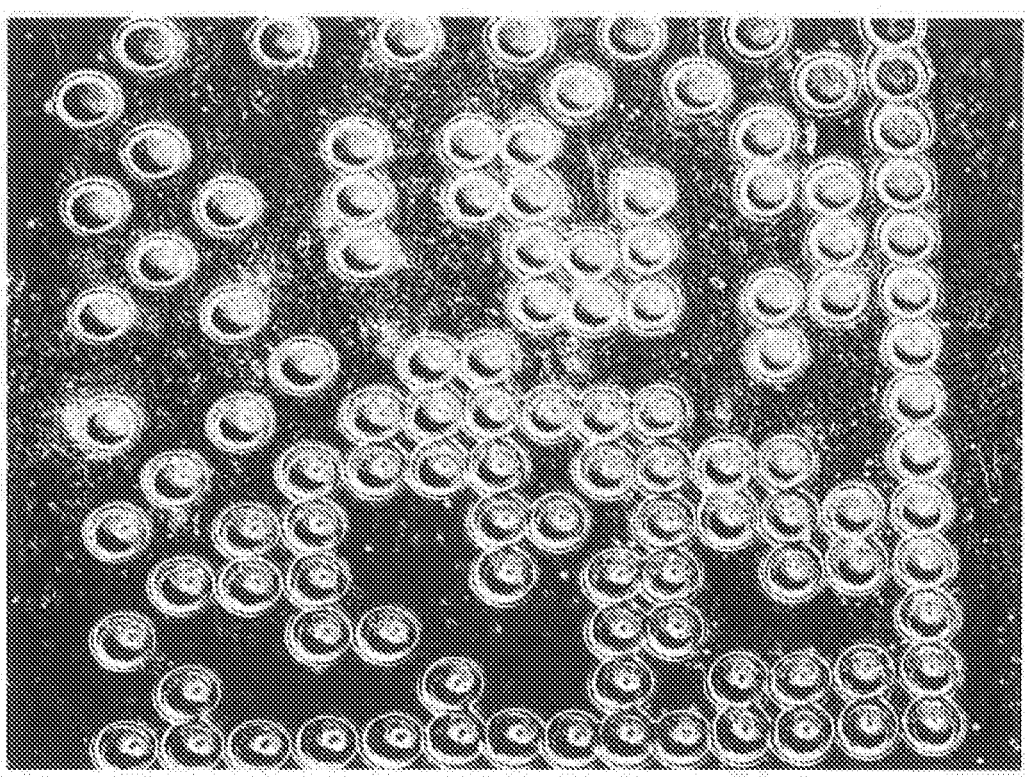
FIG. 6 is a graphical illustration of a filtered image of the dot code in FIG. 1.

Subsequent to detecting an edge of the circular dots in the grayscale image, method 300 further comprises a step 340 of filtering the edge-detected image to produce a filtered image. Filtering the edge-detected image of the dot code 10 can serve to remove noise from and sharpen the image and can result in a binary image. In an example, a high pass filter can be used to sharpen the edges of the edges of the circular dots detected in step 330. A high pass filter can include an electronic filter that passes signals with a relatively high frequency. An example of a filtered image of the dot code 10 is illustrated in FIG. 6. Filtering the edge-detected image may be performed by the processor 26 of the consumer electronic device 16 and/or the processing device 32 of the central server 20.

Figure 7:
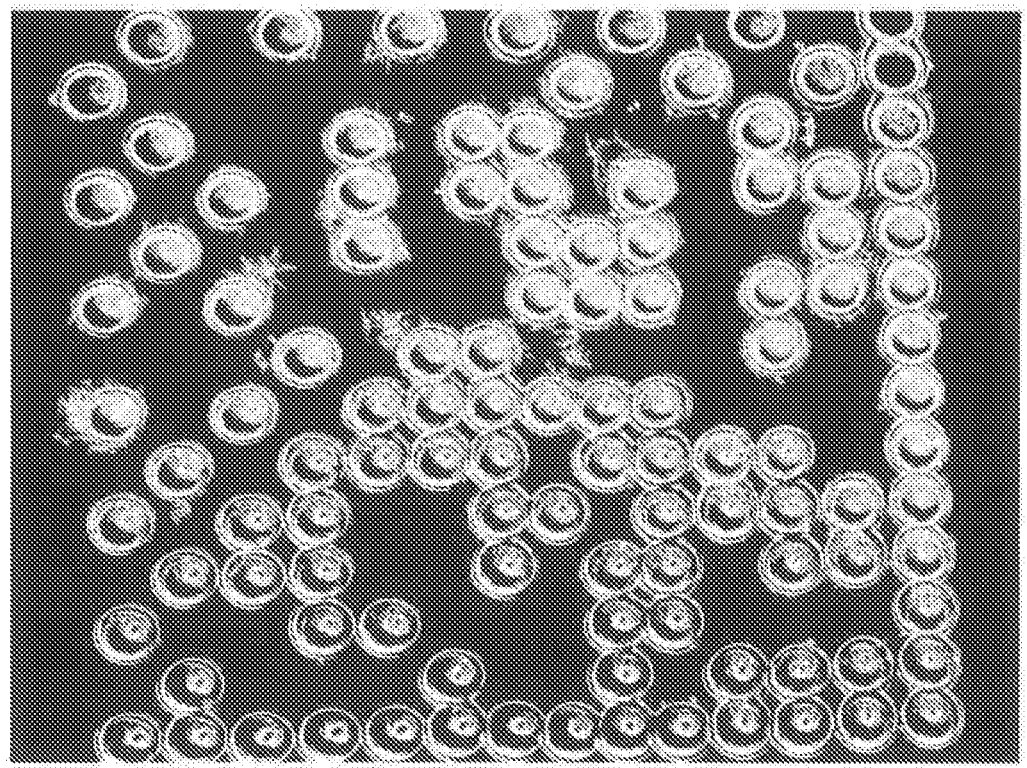
FIG. 7 is a graphical illustration of a filtered image of the dot code in FIG. 1 with background noise and small particles removed.

Method 300 may further comprise a step 350 of applying a transform to remove background noise from the filtered image. In one example of applying the transform, small particles within the filtered binary image may be filtered and background noise may be removed by testing whether a blob is resistant to a certain number of Erosion transforms. Some examples of an Erosion transform may include a Gaussian transform and/or a Butterworth transform. When a blob is resistant to an Erosion transform, the blob is not removed from the image. In the case of a small blob or particle, in the image, the Erosion transform removes the blob or particle. Using an Erosion transform on a binary image produces a new binary image and removes small details within the image, and the holes and gaps between different regions become larger. FIG. 7 illustrates an example of an image of the dot code 10 where the small particles have been removed using an Erosion transform. Applying a transform to the filtered image resulting in an Erosion transformed image can be performed by the processor 26 of the consumer electronic device 16 and/or the processing device 32 of the central server 20.

Figure 8:
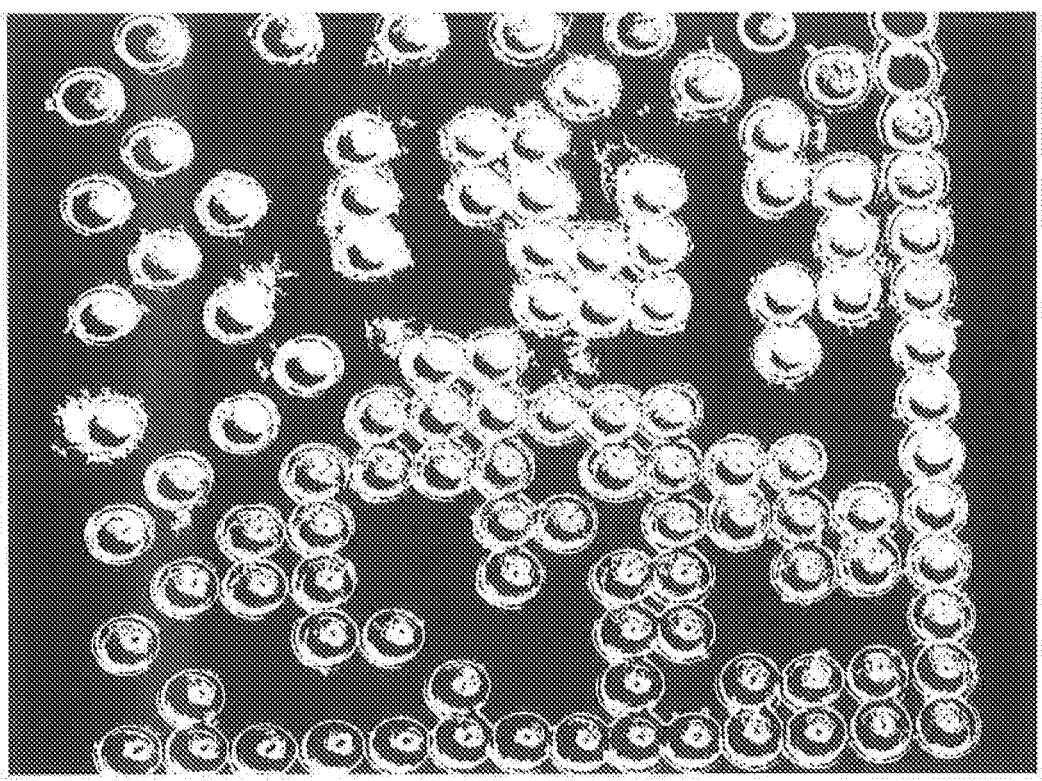
FIG. 8 is a graphical illustration of a filtered image of the dot code in FIG. 1 with open instances of the circular dots converted to closed instances.

Method 300 further comprises a step 360 of applying a Close transform to convert open instances of the circular dots to closed instances of the circular dots. For example, a Close transform (e.g., a Dilate transform followed by an Erode transform) can be applied to the Erosion transformed image of the dot code 10, where the open instances of the circular dots are transformed to closed instances of the circular dots. Applying a Close transform to the image of the dot code 10 subsequent to removing the background noise in step 350 serves to fill holes while keeping initial region sizes and takes the circular dots which may be incomplete circles due to weak edges on one side and makes them complete circles. An example of a dot code 10 having a Close transform applied to complete the circles is illustrated in FIG. 8. Applying the Close transform may be performed by the processor 26 of the consumer electronic device 16 and/or the processing device 32 of the central server 20.

Figure 9:
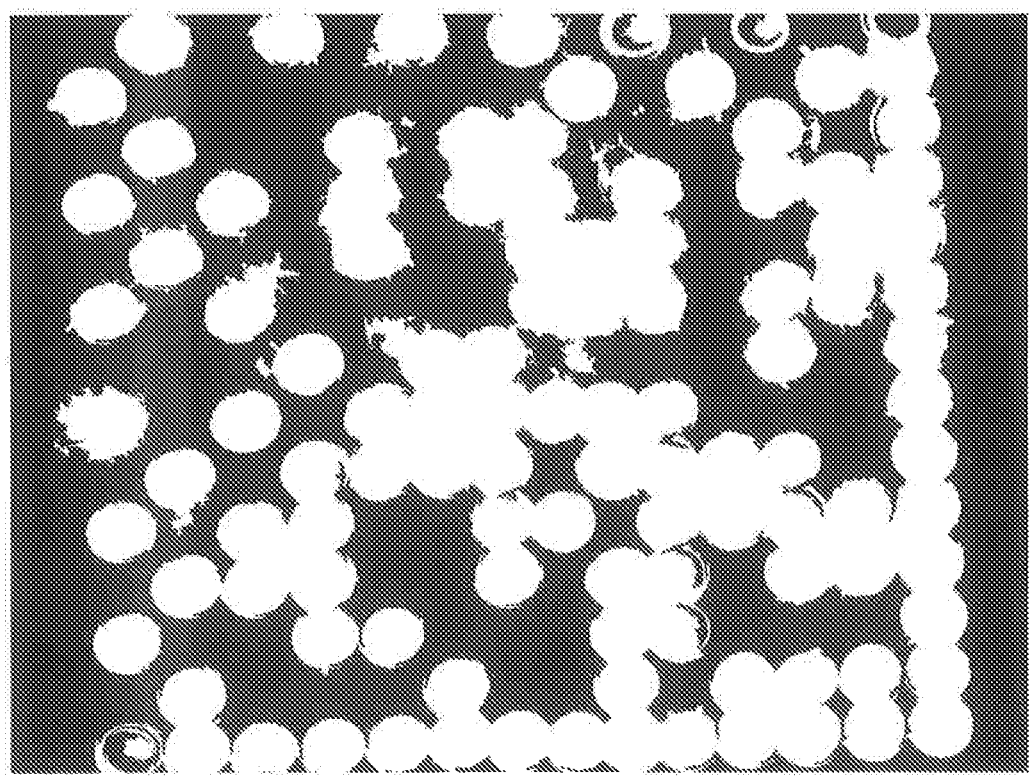
FIG. 9 is a graphical illustration of a filtered image of the dot code in FIG. 1 with closed instances of the circular dots being filled.

Method 300 may further comprise a step 370 of filling all the closed instances of the circular dots. Continuing the example from step 360, the closed instances of the circular dots in the dot code 10 may be filled by setting all areas substantially enclosed by bright pixels of the dot code 10 as bright, which causes all circular edges to become bright circles. A given point in a binary image is considered a "hole" when the point itself has a value of zero and is bounded on all sides (with either connectivity four or eight) at an arbitrary distance by a complete perimeter of points whose values are one. An example of the dot code 10 with bright circles is illustrated in FIG. 9.

Method 300 may further comprise a step 380 of identifying quantity and position of all of the circular dots. The bright circles can be counted and their positions identified, for example using a circle detection algorithm or a blob analysis algorithm. An image processing function (e.g., a Fill Hole function) can scan the entire image of the dot code 10 for points that are considered a "hole" and reset their value to one. Filling the closed instances and identifying the quantity and position of the circular dots may be performed by the processor 26 of the consumer electronic device 16 and/or the processing device 32 of the central server 20.

In a specific implementation, an end user can use a consumer electronic device 16, including a smartphone, to obtain an image of a dot code 10 carried by a glass container 12. The consumer electronic device 16 can include a processing device 26 configured to convert the image of the dot code 10 to a grayscale image using a grayscale transform, perform edge detection on the grayscale image using a Sobel edge detection operator, use a high-pass threshold filter to convert the edge detected image to a binary image, and filter out small particles or blobs using an Erosion transform. The consumer electronic device 16 can then perform at least one Close transform on the filtered image and fill the closed blobs. Filling the closed blobs can set all areas of the image that are fully enclosed by bright pixels as bright, which areas can then be counted and the respective positions identified using a circle detection analysis. It is contemplated that in other implementations, any or all steps in this implementation may be performed by the processing device 32 of the central server 20.

A benefit of using the above method 300 for decoding and processing a dot code 10 and the corresponding image processing system 18 is the ability to reliably read the dot matrix of the dot code 10, which can be challenging in a consumer setting where specialized optical hardware is not available. In these settings, reading the dot code 10 carried by the glass container 12 can be negatively affected by the glass color and/or ambient light. Additionally, method 300 and the image processing system 18 improves the ability of a standard circle detection algorithm to detect the individual dots even when the raw image is not of high quality. It is contemplated that method 300 may be performed at any point in the supply chain in which a container carrying the dot code 10 travels for decoding the dot code 10 (e.g., manufacturing, filling, transportation, an end user, and the like).

There thus has been disclosed a system for decoding and processing a dot code carried by a glass substrate or glass container that fully satisfy one or more of the objects and aims previously set forth. The disclosure has been presented in conjunction with several illustrative embodiments, and additional modifications and variations have been discussed. Other modifications and variations readily will suggest themselves to persons of ordinary skill in the art in view of the foregoing discussion. For example, the subject matter of each of the embodiments is hereby incorporated by reference into each of the other embodiments, for expedience. The disclosure is intended to embrace all such modifications and variations as fall within the spirit and broad scope of the appended claims.

The invention claimed is:

1. A method of decoding a dot code, comprising:
   converting an image of a dot code carried on a glass substrate to a grayscale image to remove effects of at least one of color of the glass substrate or color of ambient light, wherein the image includes a plurality of circular dots; and, thereafter,
   detecting edges of the circular dots in the grayscale image to produce an edge-detected image; and, thereafter,
   filtering the edge-detected image to produce a filtered image; and, thereafter,
   applying a Close transform to convert open instances of the circular dots to closed instances of the circular dots; and, thereafter,
   identifying quantity and position of all of the circular dots.

2. The method set forth in claim 1, further comprising: obtaining the image of the dot code before the converting step.

3. The method set forth in claim 2, wherein obtaining the image of the dot code includes using a hand-held consumer electronic device to obtain the image, and not specialized optical hardware.

4. The method set forth in claim 3, wherein the hand-held consumer electronic device includes at least one of a smartphone or a computer tablet.

5. The method set forth in claim 1, wherein converting the image of the dot code to a grayscale image includes using a grayscale image transform.

6. The method set forth in claim 1, wherein detecting edges of the circular dots in the grayscale image includes performing Sobel edge detection to find edges where portions of the grayscale image transition from dark to light or light to dark.

7. The method set forth in claim 6, wherein the Sobel edge detection is carried out using a Sobel operator.

8. The method set forth in claim 1, wherein filtering the edge-detected image includes applying a high-pass threshold filter to convert the edge-detected image to a binary image, thereby leaving only bright pixels where edges of the circular dots are above the high-pass threshold.

9. The method set forth in claim 1, further comprising:
   applying a transform to remove background noise from the filtered image, after filtering the edge-detected image and before applying the transform.

10. The method set forth in claim 9, wherein applying the transform to remove background noise includes testing whether a blob in the filtered image is resistant to at least one Erosion transform to remove background noise from the filtered image.

11. The method set forth in claim 1, wherein applying the Close transform includes applying a Dilate transform followed by an Erode transform.

12. The method set forth in claim 1, further comprising:
   filling all the closed instances of the circular dots, after applying the transform and before identifying quantity and position of the circular dots.

13. The method set forth in claim 12, wherein filling all the closed instances of the circular dots includes using a Fill Hole function.

14. The method set forth in claim 1, wherein identifying quantity and position of all of the circular dots includes at least one of applying a circle detection function or blob analysis function to identify the circular dots.

15. The method set forth in claim 1, wherein the dot code is a dot matrix code.

16. The method set forth in claim 1, wherein the glass substrate comprises a glass container.

17. A non-transitory computer-readable medium with instructions stored thereon, that when executed by a processor, perform the steps comprising:
   converting an image of a dot code carried by a glass substrate to a grayscale image to remove effects of at least one of color of the glass substrate or color of ambient light, where the image includes a plurality of circular dots; and, thereafter,
   detecting edges of the circular dots in the grayscale image to produce an edge-detected image; and, thereafter,
   filtering the edge-detected image to produce a filtered image; and, thereafter,
   applying a Close transform to convert open instances of the circular dots to closed instances of the circular dots; and, thereafter,
   identifying quantity and position of all of the circular dots.

18. The non-transitory computer-readable medium set forth in claim 17, wherein the instructions perform the step of applying a transform to remove background noise from the filtered image.

19. The non-transitory computer-readable medium set forth in claim 17, wherein the instructions perform the step of filling all the closed instances of the circular dots.

20. An image processing system for decoding a dot code carried on a glass substrate, comprising:
   a central server;
   a consumer electronic device configured to capture an image of the dot code and to electronically communicate the captured image to the central server; and
   a database accessible by the server and that provides storage for data relating to the image of the dot code;
   wherein the consumer electronic device is configured to:
      obtain the image of the dot code, wherein the image includes a plurality of circular dots; and, thereafter,
      convert the image to a grayscale image to remove effects of at least one of color of the glass substrate or color of ambient light; and, thereafter,
      detect edges of the circular dots in the grayscale image to produce an edge-detected image; and, thereafter,
      filter the edge-detected image to produce a filtered image; and, thereafter, apply a transform to remove background noise from the filtered image; and, thereafter, apply a Close transform to convert open instances of the circular dots to closed instances of the circular dots; and, thereafter, fill all the closed instances of the circular dots; and, thereafter, identify quantity and position of all of the circular dots.

21. The image processing system set forth in claim 20, wherein the dot code is a dot matrix code.

22. The image processing system set forth in claim 20, wherein the glass substrate comprises a glass container.

23. The image processing system set forth in claim 20, wherein the consumer electronic device includes at least one of a smartphone or a tablet.

24. The image processing system set forth in claim 20, wherein the edge-detected image is produced using a Sobel operator.

25. The image processing system set forth in claim 20, wherein the consumer electronic device is configured to apply a transform to remove background noise from the filtered image, after filtering the edge-detected image and before applying the transform.

26. The image processing system set forth in claim 20, wherein the consumer electronic device is configured to fill all the closed instances of the circular dots.

* * * * *